United States Patent [19]

Hirosawa et al.

[11] Patent Number: 4,658,925
[45] Date of Patent: Apr. 21, 1987

[54] APPARATUS FOR OPENING AND CLOSING LOUVER

[75] Inventors: Yasunori Hirosawa; Souichirou Okudaira, both of Aichi, Japan

[73] Assignee: Toyota Jidosha Kabushiki Kaisha, Japan

[21] Appl. No.: 660,050

[22] Filed: Oct. 12, 1984

[30] Foreign Application Priority Data

Oct. 14, 1983 [JP] Japan ................. 58-192262

[51] Int. Cl.4 ............................. B60K 11/08
[52] U.S. Cl. .................... 180/68.1; 98/2.01;
98/2.16; 123/41.05; 123/41.06; 180/69.24;
296/208
[58] Field of Search ............... 180/68.1, 68.2, 69.24;
296/91, 192, 208; 15/250.16, 250.17, 250.19,
250 R; 98/2.01, 2.07, 2.16; 123/41.05, 41.06,
41.07

[56] References Cited

U.S. PATENT DOCUMENTS

| 2,837,372 | 6/1958  | Odon    |           |
|-----------|---------|---------|-----------|
| 3,694,846 | 10/1972 | Parker  | 15/250.16 |
| 3,845,700 | 11/1974 | Lefeuvre | 98/2.01  |
| 3,961,605 | 6/1976  | Kaltner | 180/68.1  |
| 4,476,820 | 8/1984  | Nixon   | 123/41.06 |

FOREIGN PATENT DOCUMENTS

| 2114424   | 10/1972 | Fed. Rep. of Germany ... 15/250.16 |
| 3,214,588 | 11/1982 | Fed. Rep. of Germany . |
| 3,211,793 | 11/1982 | Fed. Rep. of Germany . |
| 2,753,371 | 6/1979  | Fed. Rep. of Germany . |
| 802,069   | 8/1936  | France . |
| 1,138,106 | 6/1957  | France . |
| 976,079   | 11/1964 | United Kingdom . |

Primary Examiner—John J. Love
Assistant Examiner—Eric D. Culbreth
Attorney, Agent, or Firm—Finnegan, Henderson, Farabow, Garrett & Dunner

[57] ABSTRACT

A wiper for wiping a windshield is concealed by a louver when the wiper is not used. When the engine needs to be cooled, however, the louver is moved such as to open a wiper housing portion. Thus, the engine room is opened through the wiper housing portion, whereby cooling of the engine is promoted.

15 Claims, 7 Drawing Figures

APPARATUS FOR OPENING AND CLOSING LOUVER

BACKGROUND OF THE INVENTION

1. Field of the Invention

The present invention relates to an apparatus for opening and closing a louver for concealing a wiper that is adapted to be housed at a bottom portion of a windshield.

2. Description of the Prior Art

As is well known, the louver is employed fundamentally to conceal the wiper. The louver, however, not only serves to protect the wiper but also contributes to a reduction in an air resistance encountered by a vehicle when it is running.

Since such a louver is opened and closed by means of remote control from a driver's seat of the vehicle, the louver generally includes a driving mechanism and is adapted to be opened only when the wiper is to be used.

On the other hand, a structure has been proposed which promotes ventilation in an engine room such as to improve an engine cooling effect. To adopt such structure, however, it is necessary to provide an opening and closing means for an acess to the engine which is controlled either automatically or as desired.

SUMMARY OF THE INVENTION

In view of the above, it is a primary object of the present invention to provide an apparatus for opening and closing a louver which allows the louver to serve not only for concealing the wiper but also for cooling the space occupied by the engine by making positive use of the louver.

To this end, according to the present invention, the louver is adapted to be opened not only when the wiper is used but also when the vehicle speed is less than a predetermined value and the engine needs to be cooled, whereby a portion of the air passing through the engine room is discharged to the outside through an opening formed between the open louver and the windshield, thereby positively cooling the engine unit.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PEFERRED EMBODIMENT

The present invention will be described hereinunder in detail through one embodiment with reference to the accompanying drawings.

Figure 1:
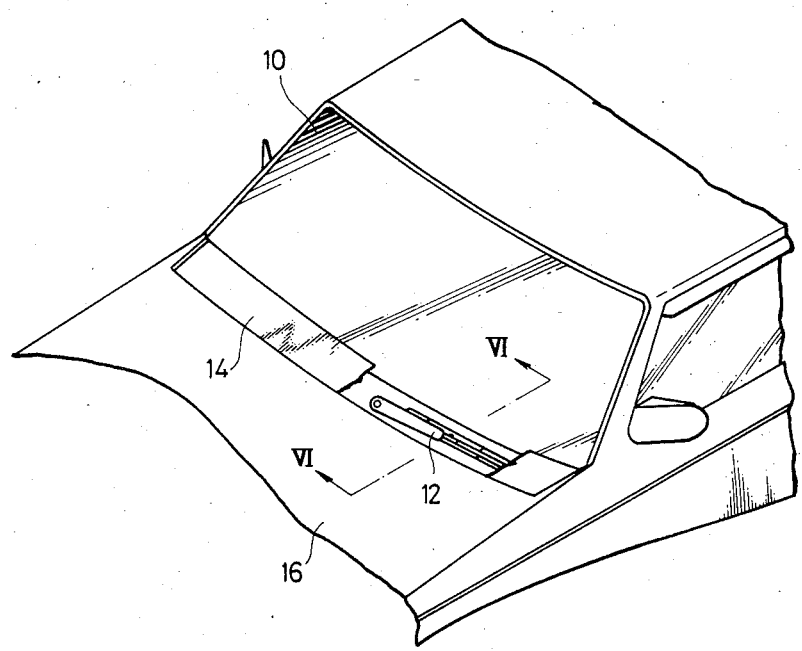
FIG. 1 is a perspective view of an essential part of an automobile having a louver opening and closing apparatus in accordance with the present invention.

FIG. 1 shows a part of an automobile which is equipped with a louver opening and closing apparatus in accordance with the invention. In the Figure, a wiper 12 is housed at a bottom portion of a windshield 10. The wiper 12 is concealed by a louver 14. In this Figure, a part of the louver 14 is cut away in order to show the concealed wiper 12.

Figure 2:
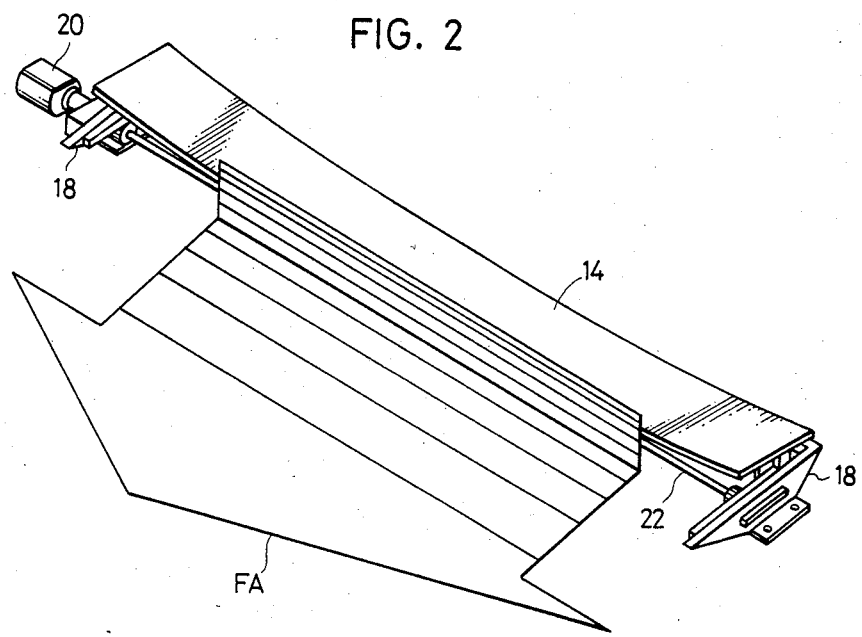
FIG. 2 is a perspective view showing the disposition of a louver moving mechanism.

FIG. 2 shows one example of the disposition of a mechanism for moving the louver 14. In this Figure, a moving mechanism 18 is provided at each of the ends, in the longitudinal direction, of the louver 14. One of the moving mechanisms 18 is provided with a driving motor 20, together with a proper speed-reduction means. The other moving mechanism 18 receives the power transmitted to the driving motor 20 through a power-transmitting cable 22. The louver 14 is normally placed such that the surface thereof is substantially flush with that of a hood 16 (see FIGS. 1 and 3). When the louver 14 is opened, it is moved and then moved downward once toward the front end of the vehicle below the hood 16 as shown by the arrow FA in FIG. 2.

Figure 3:
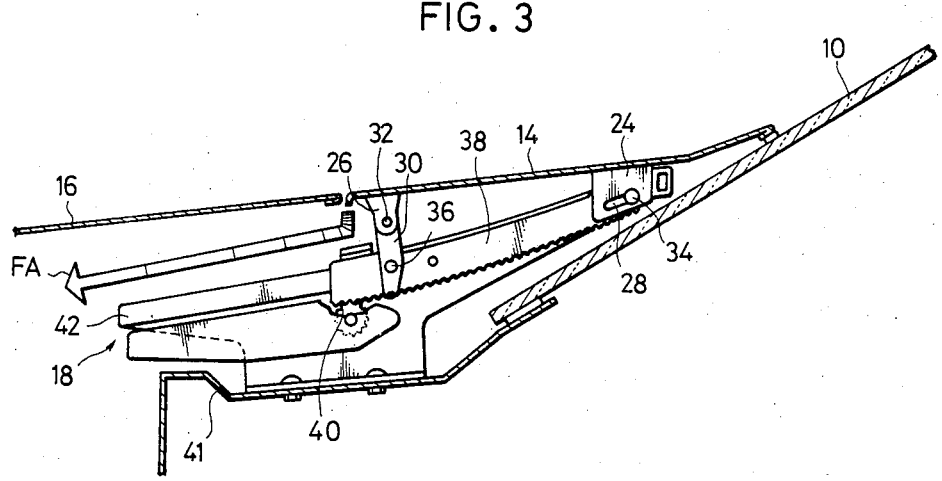
FIG. 3 is a partly-sectioned side elevational view showing one example of the construction of the louver moving mechanism.

Referring now to FIG. 3 which shows in detail one example of the construction of the moving mechanism 18, the louver 14 is formed at each of the longitudinal ends thereof with a pair of flanges 24, 26. The flange 24 on the side of the louver 14 which is closer to the rear end of the vehicle is formed with a slot 28, while the flange 26 pivotally supports a link 30 by a pin 32. The slot 28 of the flange 24 receives a pin 34 projecting from a rack 38. The distal end of the link 30 is pivotally supported by a pin 36 at a portion of the rack 38 on the side thereof which is closer to the front end of the vehicle. The link 30 is urged by a resilient member (not shown), so that the link 30 will rotate about the pin 36 in a counterclockwise direction, as shown in FIG. 3. The rack 38 is meshed with a pinion gear 40 to which the driving force of the motor 20 is transmitted. Further, in front of the rack 38 is provided a curved rail 42 which is mounted on a cowl plate 41 such as to guide the rack 38 toward the front or rear end of the vehicle.

Figure 6:
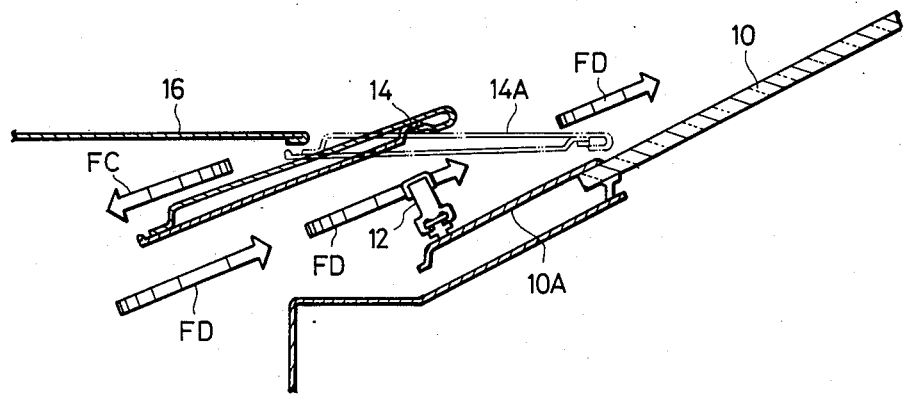
FIGS. 6 and 7 are illustrations showing the flow of air when the louver is open.
Figure 7:
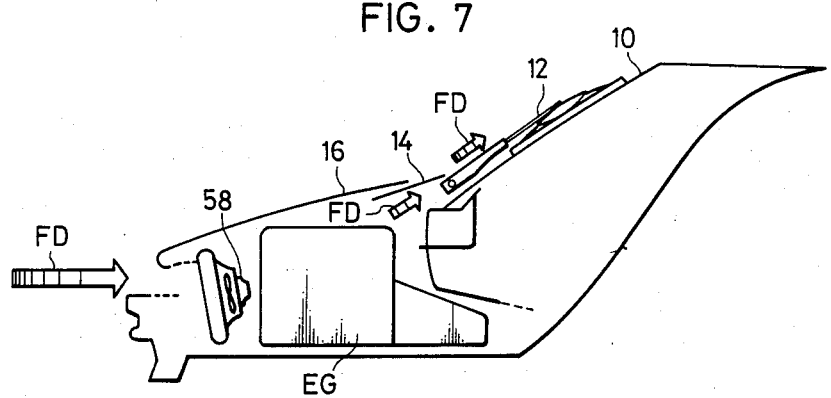

As shown in FIGS. 6 and 7, when the louver 14 is open, the inside of the engine room is allowed to communicate with an outside air through an opening formed between the louver 14 and the windshield 10.

The operation of the moving mechanism 18 constructed described above will be explained hereinunder.

First of all, when current which flows in a first direction (referred to as "opening current", hereinafter) flows through the armature of the driving motor 20 (see FIG. 2), the pinion gear 40 is mounted on a frame member 40a and is rotated in the counterclockwise direction as viewed in FIG. 3. As a consequence, the rack 38 is moved leftwardly as viewed in FIG. 3. However, the louver 14 abuts at its front end against the hood 16 and therefore is prevented from moving. As the pinion gear 40 is further rotated, the rack 38 is also further moved leftwardly as viewed in FIG. 3, thus causing the pin 36 as one of the fulcrums of the link 30 to move leftwardly. Consequently, the pin 32 as the other fulcrum of the link 30 is moved downwardly, thus causing the distal end of the louver 14 to be moved downwardly. At this point of time, the flange 24 has the pin 34 located at an intermediate portion of the slot 28. After the above-described movement has been effected, the louver 14 is leftwardly moved as shown by the arrow FA in FIG. 3.

On the other hand, when current which flows in the direction opposite to that of the above-described opening current (referred to as "closing current", hereinafter) flows through the armature of the driving motor 20, the pinion gear 40 is rotated in the clockwise direction as viewed in FIG. 3, so that the louver 14 is moved in the direction opposite to the direction of the arrow FA such as to be restored to its closed state. In other words, the louver 14 is adapted to be opened when the opening current flows through the driving motor 20 and to be closed when the closing current flows through the driving motor 20.

Figure 4:
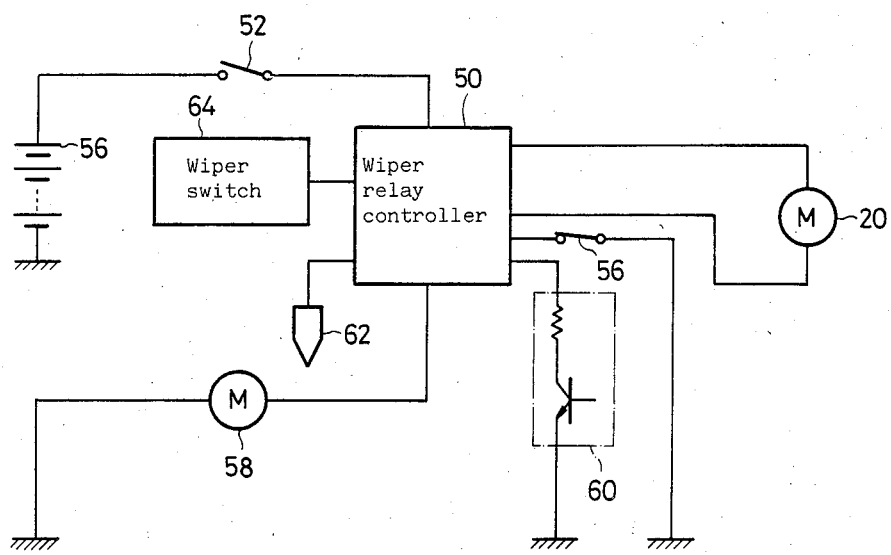
FIG. 4 is a block diagram showing one example of a controller which controls opening and closing of the louver.

Referring now to FIG. 4 which shows one example of a controller for controlling opening and closing of the louver 14, a wiper relay controller 50 is connected to a power source 54 through keyswitches 52, 56. The keyswitches 52, 56 are usually adapted to turn "ON" in response to the operation of an ignition key. Further, the power source 54 is usually a battery (not shown) mounted on the automobile.

The wiper relay controller 50 is connected is ground with a fan motor 58 for cooling a radiator (not shown) and a vehicle speed sensor 60 which are inserted therebetween in parallel. Further, a water temperature sensor 62 for sensing the temperature of the cooling water which is cooled by the radiator is connected to the fan motor 58 through the wiper relay controller 50. The arrangement is such that when the water temperature sensor 62 detects the fact that the cooling-water temperature is above a predetermined value, the fan motor 58 is energized, and the energized state is detected by the wiper relay controller 50. As shown in FIG. 4, the vehicle speed sensor 60 includes a resistor and a transistor, and is arranged such that the transistor effects a switching operation if the vehicle speed exceeds 60 km/H, whereby the vehicle speed is detected by the wiper relay controller 50.

Further, the wiper relay controller 50 is connected with a wiper switch 64 and the driving motor 20 of the above-described moving mechanism 18. The wiper switch 64 is provided so as to be operated by the driver sitting on the driver's seat and is manually operated. The driving motor 20 is connected at both terminals thereof to the wiper relay controller 50, since the driving motor 20 is supplied with each of the opening and closing currents which are opposite to each other in flowing direction. Thus, the driving motor 20 is adapted to obtain the opening current from the wiper relay controller 50 when the wiper switch 64 is actuated or when the fan motor 58 is being energized and the vehicle speed is not higher than 60 km/H (the vehicle speed may be below 60 km/H).

Figure 5:
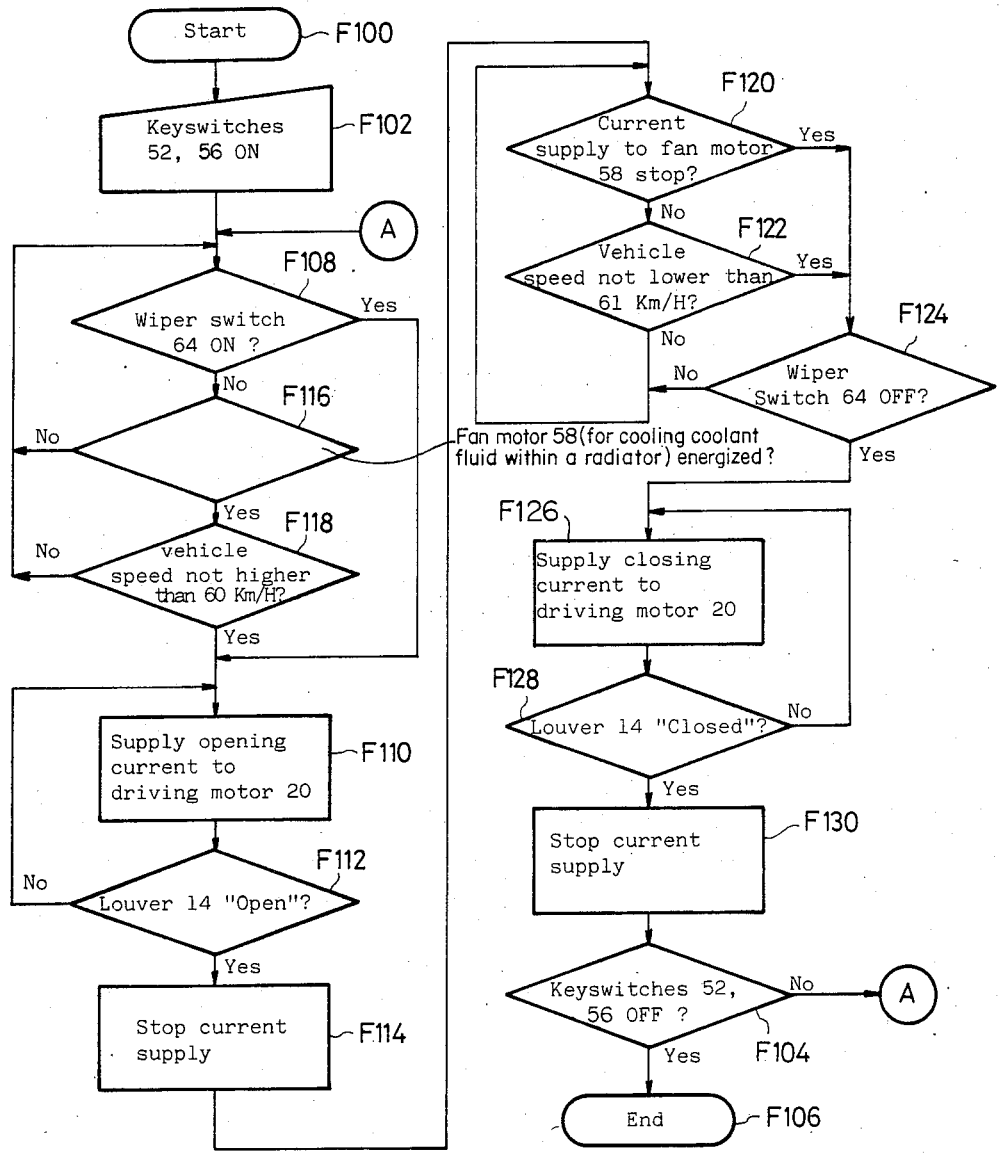
FIG. 5 is a flow chart showing the louver opening and closing control procedure.

The following is a description of the operation of the above-described embodiment as a whole with reference to FIGS. 5 to 7 in addition to the above-described drawings.

FIG. 5 shows the operation procedure in the form of a flow chart. FIG. 6 is a sectional view taken along the line VI—VI of FIG. 1. Further, FIG. 7 shows the flow of air in the engine room.

The following operation is carried out when the keyswitches 52, 54 are "ON". For this reason, when the keyswitches 52, 54 are turned "ON", the operation is started (see the steps F100 and F102 in FIG. 5); when the keyswitches 52, 54 are turned "OFF", the operation is ended (see the steps F104 and F106 in FIG. 5). Although the flow chart in FIG. 5 shows such that a judgement is made in the last step of the operation as to whether or not the keyswitches 52, 54 are "OFF" (see the step F104 in FIG. 5), this is only for convenience, and, in practice, the judgement is constantly made regardless of the steps on the flow chart.

When the keyswitches 52, 54 are "ON", a closed loop operation shown by the jump sign "A" is continuously carried out.

First of all, a judgement is made as to whether or not the wiper switch 64 is "ON" (see the step F108 in FIG. 5). When the driver needs the operation of the wiper 12, the wiper switch 64 is turned "ON". This fact is detected by the wiper relay controller 50, whereby the opening current is supplied to the driving motor 20 (see the step F110 in FIG. 5). This opening current continuously flows until the louver 14 has been completely opened (see the steps F110, F112 and F114 in FIG. 5).

Even when the wiper switch 64 is "OFF", if a rise in temperature of the cooling water is detected by the water temperature sensor 62, the fan motor 58 is energized (see the step F116 in FIG. 5). When the fan motor 58 is being energized and the vehicle speed is not higher than 60 km/H (see the step F118 in FIG. 5), these facts are detected by the wiper relay controller 50, whereby the driving motor 20 is supplied with the opening current, thus causing the louver 14 to be opened (see the steps F110, F112 and F114 in FIG. 5). In this case, the wiper switch 64 is "OFF"; therefore, the wiper 12 is not operated. However, as shown in FIGS. 5 and 7, when the louver 14 in the position shown by the broken line 14A is moved in the direction of the arrow FC such as to be opened, an opening is formed between the louver 14 and a lower mole portion 10A which constitutes the bottom portion of the windshield 10. In other words, air flows through the space occupied by the engine as shown by the arrows FD. On the other hand, the conditions for the louver 14 to be opened in this case include the condition that current is being supplied to the fan motor 58 as described above, and therefore, the fan motor 58 is rotating at this time. Accordingly, the flow of air in the direction of the arrows FD is further intensified, so that the whole of the unit having an engine EG centered therein is excellently cooled.

The following is a description of the closing operation of the louver 14.

The closing operation of the louver 14 is carried out when the following conditions are satisfied: the current supply to the fan motor 58 is stopped or the vehicle speed is 61 km/H or higher; and the wiper switch 64 is turned "OFF" (see the steps F120, F122 and F124 in FIG. 5). More specifically, the current supply to the fan motor 58 is stopped when the water temperature sensor 62 detects the fact that the temperature of the cooling water has lowered below a predetermined value, and consequently, it is no longer necessary to rotate the fan motor 58 for cooling the engine unit. On the other hand, the fact that the vehicle speed is 61 km or higher represents the fact that the natural draft is sufficiently strong and that there is therefore no need for a special cooling operation. Further, the fact that the wiper switch 64 is turned "OFF" means that the driver no longer needs the operation of the wiper 12.

In the above-described cases, the driving motor 20 is supplied with the closing current until the louver 14 has been completely closed (see the steps F126, F128 and F130 in FIG. 5).

Thus, the louver 14 is opened or closed by repetition of the above-described operations, and the louver 14 is opened when the wiper 12 is to be used or the engine needs to be cooled.

It is to be noted that, in the flow chart shown in FIG. 5, either the judgement shown in the step F116 or the judgement shown in the step F118 may be first made, and the same is the case with the judgements respectively shown in the steps F120 and F122.

It is to be noted also that, although, in the above-described embodiment, it is, as a matter of course, possible to constitute the wiper relay controller 50 by a microprocessor or other similar means, the wiper relay controller 50 can be easily constituted by an ordinary relay means or logical circuit. For instance, the judgement as to whether or not a given condition meets the condition wherein the fan motor 58 is being energized and the vehicle speed is not higher than 60 km/H corresponds to an ANDing operation. Therefore, it is possible to obtain a judgement of this fact by means of two relay switches connected in series or an AND gate circuit. On the other hand, the judgement as to whether a given condition meets the above-described condition or the condition wherein the wiper switch 64 is "ON" corresponds to an ORing operation. It is, therefore, possible to obtain a judgement of these facts by means of two relay switches connected in parallel or an OR gate circuit.

Further, although in the above-described embodiment the cooling conditions of the engine unit are detected from the current supply to the fan motor and the vehicle speed, the engine unit cooling conditions may be detected by other means, for example, by directly sensing the temperature of the engine.

As has been described above, according to the louver opening and closing apparatus of the present invention, the louver is opened or closed not only for concealing the wiper but also for cooling the engine unit according to the cooling conditions of the engine unit. Thus, the louver is advantageously capable of serving also as a cooling means.

What is claimed is:

1. An apparatus for opening and closing a louver provided at a bottom portion of a windshield of a vehicle to conceal a windshield wiper and to cool a vehicle engine room housing an engine, said apparatus comprising:
   (a) driving means for opening and closing said louver to draw a flow of air through said vehicle engine room;
   (b) detecting means for detecting a state wherein said engine requires cooling;
   (c) vehicle speed sensing means for gauging the speed of said vehicle;
   (d) conduit means extending between said bottom portion of said windshield beneath said louver and said vehicle engine room for conveying air when said louver is opened to ventilate said vehicle engine room;
   (e) control means for actuating said driving means to open said louver when said detecting means detects a state wherein said engine requires cooling or when said vehicle speed sensing means gauges that the vehicle speed is less than a predetermined value, thereby providing ventilation to said engine room and cooling said engine;
   (f) a hood covering said vehicle engine room; and
   (g) support means for supporting said louver, said support means having a cowl plate aligned along said conduit means, said support means also having a rail mounted on said cowl plate to guide said louver forward and rearward relative to said vehicle in response to said driving means.

2. The apparatus according to claim 1, wherein said vehicle engine includes a radiator containing a coolant fluid, a fan for cooling said coolant fluid, and generating means for producing current to operate said fan, and wherein said detecting means determines whether current is being supplied to said fan.

3. The apparatus according to claim 1, wherein said detecting means includes a thermometer which detects a temperature of said engine.

4. The apparatus according to claim 1, wherein said driving means positions said louver toward the front end of said vehicle to open said conduit means.

5. The apparatus according to claim 4, wherein said louver is positioned substantially beneath said hood when said louver is fully opened.

6. The apparatus according to claim 1, wherein said support means includes rack means mounted on said rail and connected to the base of said louver, wherein said driving means includes pinion means for engaging said rack means to move said louver forward and rearward, and wherein said support means includes a frame member for supporting said pinion means.

7. The apparatus according to claim 6, said louver having a first end proximate said hood and a second end proximate said windshield, said support means having link means pivotally connecting said first end and a forward portion of said rack, said support means also having guide means connecting said second end and a rearward portion of said rack for allowing said rack to slide relative to said louver, wherein said link means and said guide means cooperate to position said louver substantially beneath said hood when said louver is opened and to position said first end adjacent said hood when said louver is closed.

8. An apparatus for opening and closing a louver mounted on a vehicle adjacent a windshield, said apparatus comprising:
   (a) a housing portion extending substantially beneath said louver, wherein said housing portion includes support means for supporting said louver, said support means including a cowl plate;
   (b) a wiper device for wiping said windshield, said wiper device being housed in said housing portion when said wiper device is in an inoperative state, said vehicle having an engine room and a hood, and means for providing air transfer between said engine room and said housing portion, said cowl plate of said housing portion being aligned along said air transfer means;
   (c) said louver substantially enclosing said wiper device within said wiper housing portion when said louver is closed, said louver having an upper surface substantially flush with said hood of said engine room when said wiper device is in an inoperative state;
   (d) driving means for movably positioning said louver to open and to close said louver, wherein said wiper device is operable when said louver is opened, wherein said support means includes a rail mounted on said cowl plate to guide said louver forward and rearward relative to said vehicle in response to said driving means; and (e) control means for actuating said driving means to open said louver and allow said air transfer means to communicate with outside air through said wiper housing portion, thereby promoting ventilation in said engine room.

9. The apparatus according to claim 8, wherein said engine room includes a radiator containing a coolant fluid, a fan for cooling said coolant fluid, and generating means for producing a current to operate said fan, and wherein said control means is provided with means for detecting current supplied to said fan for cooling said radiator.

10. The apparatus according to claim 8, wherein said control means is provided with means for measuring the temperature of said engine.

11. The apparatus according to claim 8, wherein said driving means positions said louver toward the front end of said vehicle to ventilate said engine room through said air transfer means.

12. The apparatus for opening and closing a louver according to claim 11, wherein said vehicle includes a hood for said vehicle engine room, and wherein said louver is positioned substantially beneath said hood when said louver is fully opened.

13. The apparatus according to claim 10, wherein said support means includes rack means connected to the base of said louver and mounted on said rail, wherein said driving means includes pinion means for engaging said rack means to move said louver forward and rearward, and wherein said support means includes a frame member for supporting said pinion means.

14. The apparatus according to claim 13, said louver having a first end proximate said hood and a second end proximate said windshield, said support means having link means pivotally connecting said first end and a forward portion of said rack, said support means also having guide means connecting said second end and a rearward portion of said rack for allowing said rack to slide relative to said louver, wherein said link means and said guide means cooperate to position said louver substantially beneath said hood when said louver is opened and to position said first end adjacent said hood when said door is closed.

15. An apparatus for opening and closing a louver according to claim 10, wherein said control means is provided with means for detecting the temperature of said engine.

* * * * *